United States Patent
El Mallawany

(10) Patent No.: US 12,435,599 B2
(45) Date of Patent: Oct. 7, 2025

(54) DOWNHOLE SAFETY VALVE WITH ELECTRO-MAGNETIC TOOTH BRAKE SYSTEM

(71) Applicant: Halliburton Energy Services, Inc., Houston, TX (US)

(72) Inventor: Ibrahim El Mallawany, Al-Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 11 days.

(21) Appl. No.: 18/427,029

(22) Filed: Jan. 30, 2024

(65) Prior Publication Data
US 2025/0243729 A1    Jul. 31, 2025

(51) Int. Cl.
*E21B 34/06* (2006.01)
*F16K 17/36* (2006.01)
*F16K 31/04* (2006.01)

(52) U.S. Cl.
CPC ............ *E21B 34/066* (2013.01); *F16K 17/36* (2013.01); *E21B 2200/03* (2020.05); *E21B 2200/05* (2020.05); *F16K 31/047* (2013.01)

(58) Field of Classification Search
CPC . E21B 2200/03; E21B 34/066; E21B 2200/05
See application file for complete search history.

(56) References Cited

U.S. PATENT DOCUMENTS

| | | | |
|---|---|---|---|
| 6,241,015 B1 * | 6/2001 | Pringle | E21B 34/066 166/320 |
| 6,719,057 B2 * | 4/2004 | Johansen | E21B 34/04 166/97.1 |
| 11,248,441 B2 | 2/2022 | Vick, Jr. et al. | |
| 11,643,905 B2 | 5/2023 | Vick, Jr. et al. | |
| 11,668,160 B1 | 6/2023 | Passmore et al. | |

(Continued)

FOREIGN PATENT DOCUMENTS

WO    2022197666 A1    9/2022

OTHER PUBLICATIONS

"Sepac Your Clutch and Brake Company, Magnetically Engaged Tooth Brakes" Web based Information Sheet, Sepac, https://sepac.com/products/view/magnetically-engaged-tooth-brake/.

(Continued)

*Primary Examiner* — Angelisa L. Hicks
(74) *Attorney, Agent, or Firm* — Conley Rose, P.C.; Rodney B. Carroll

(57) ABSTRACT

Disclosed embodiments relate to electric safety valves for a well, which may be configured to close in the event of a power loss for example. In embodiments, the electric safety valve may include an electro-magnetic tooth brake system. For example, a plurality of teeth may be coupled to a translating sleeve disposed within an outer housing, a pinion may be mounted within the outer housing and configured to mesh with the plurality of teeth, and an electric tooth brake may have brake teeth configured to engage the pinion upon activation of an electro-magnet. Thus, when the electro-magnet is powered and the teeth are engaged/meshing, the translating sleeve may be held in position to hold open the valve. A loss of power may disengage the teeth, releasing the translating sleeve and allowing the valve to close. Related methods and systems are also disclosed.

22 Claims, 6 Drawing Sheets

(56) References Cited

U.S. PATENT DOCUMENTS

| | | |
|---|---|---|
| 2002/0108747 A1 | 8/2002 | Dietz et al. |
| 2004/0173362 A1* | 9/2004 | Waithman ............. E21B 34/066 166/386 |
| 2010/0025045 A1 | 2/2010 | Lake et al. |
| 2011/0155381 A1 | 6/2011 | Reaux |
| 2017/0002945 A1* | 1/2017 | Phelps ................. E21B 34/066 |
| 2022/0298887 A1* | 9/2022 | Ackroyd ............... E21B 34/066 |
| 2023/0349262 A1* | 11/2023 | Scott ................... E21B 34/066 |

OTHER PUBLICATIONS

Foreign Communication from Related Application—International Search Report and Written Opinion of the International Searching Authority, International Application No. PCT/US2024/013688, dated Oct. 28, 2024, 10 pages.

\* cited by examiner

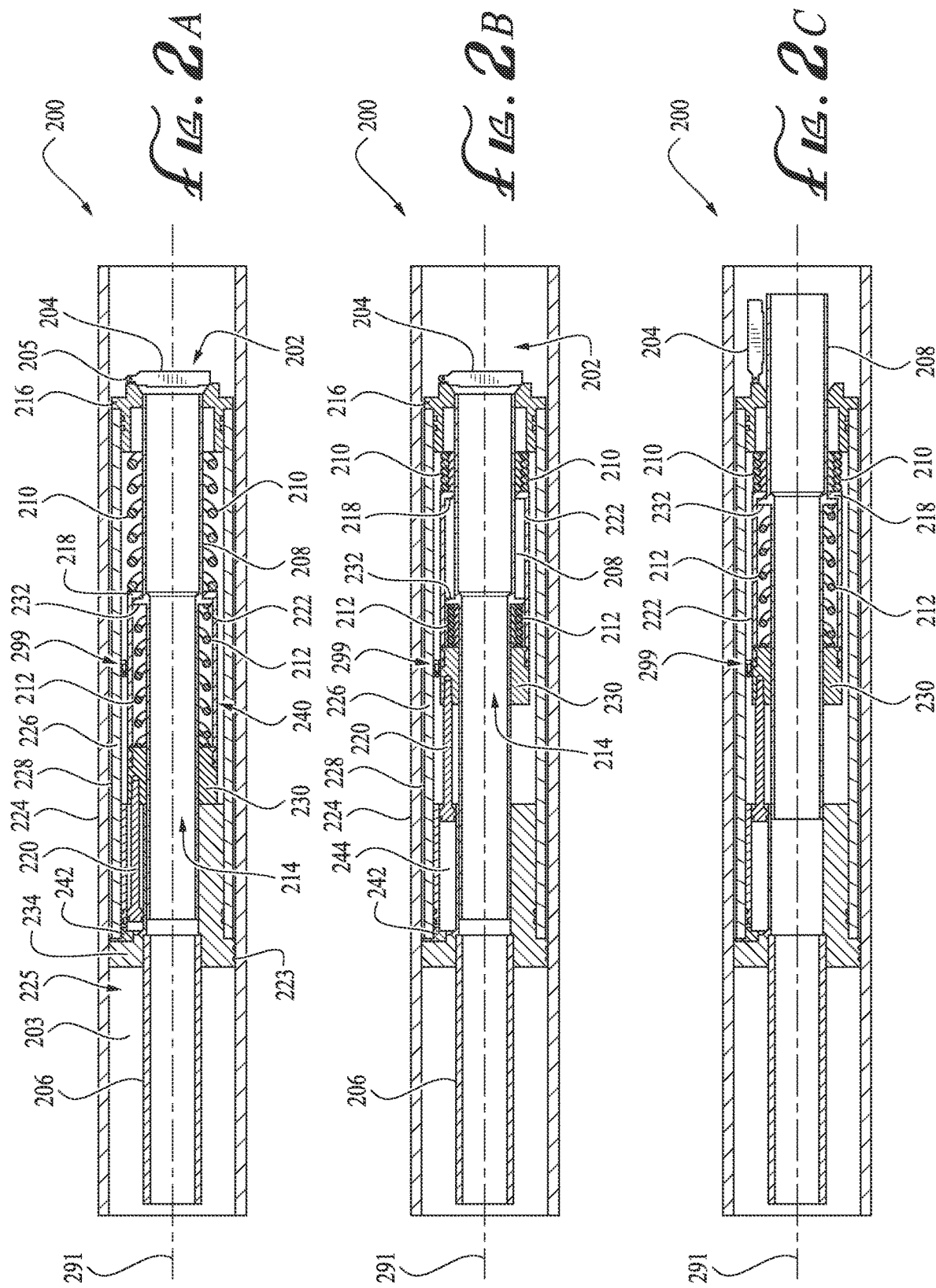

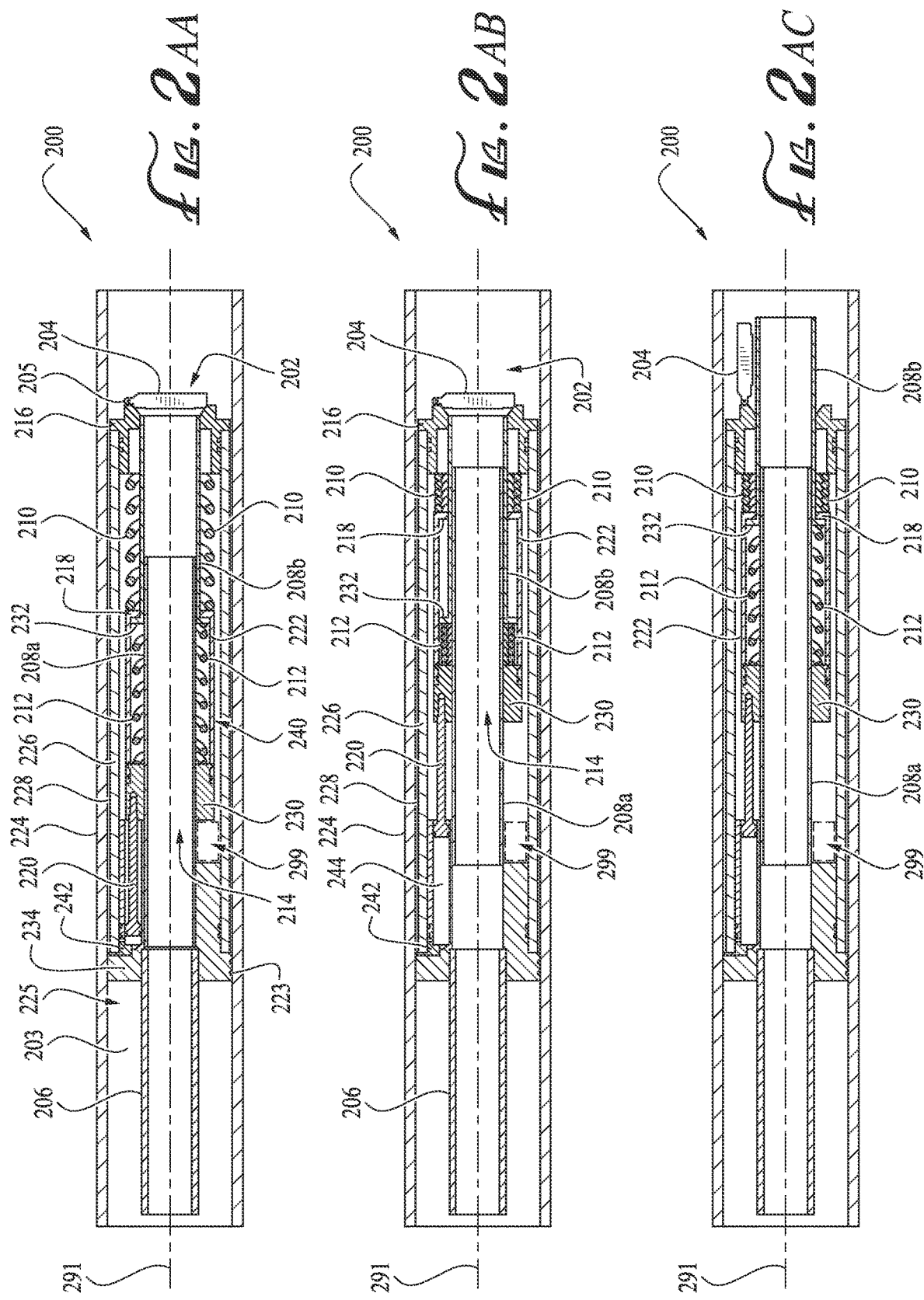

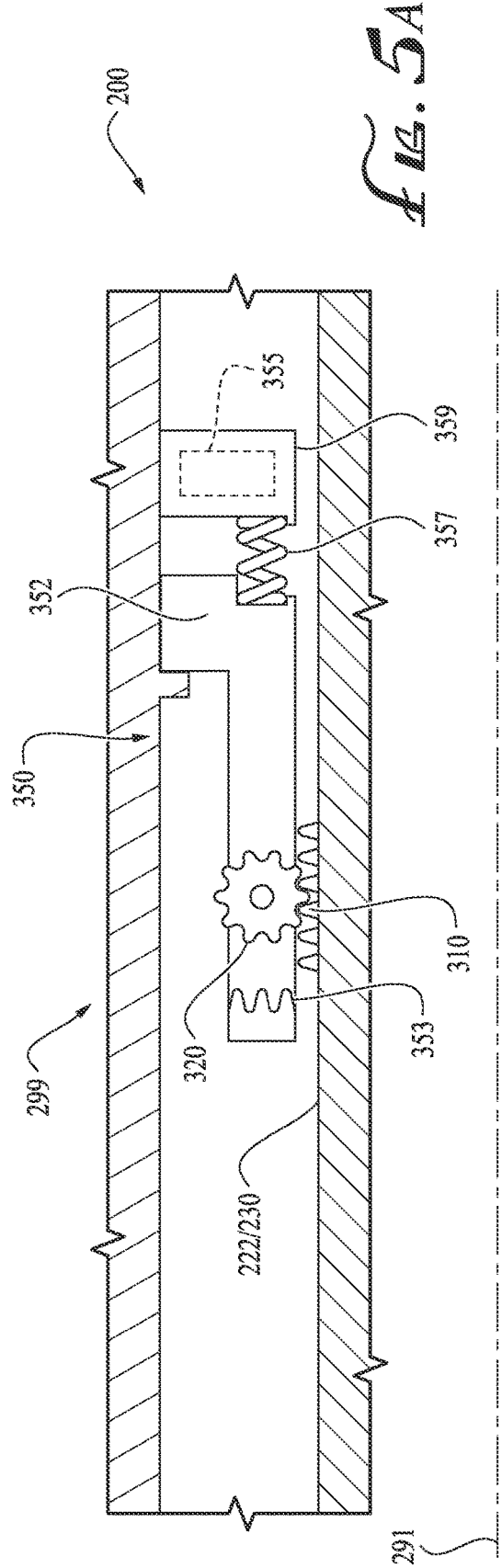
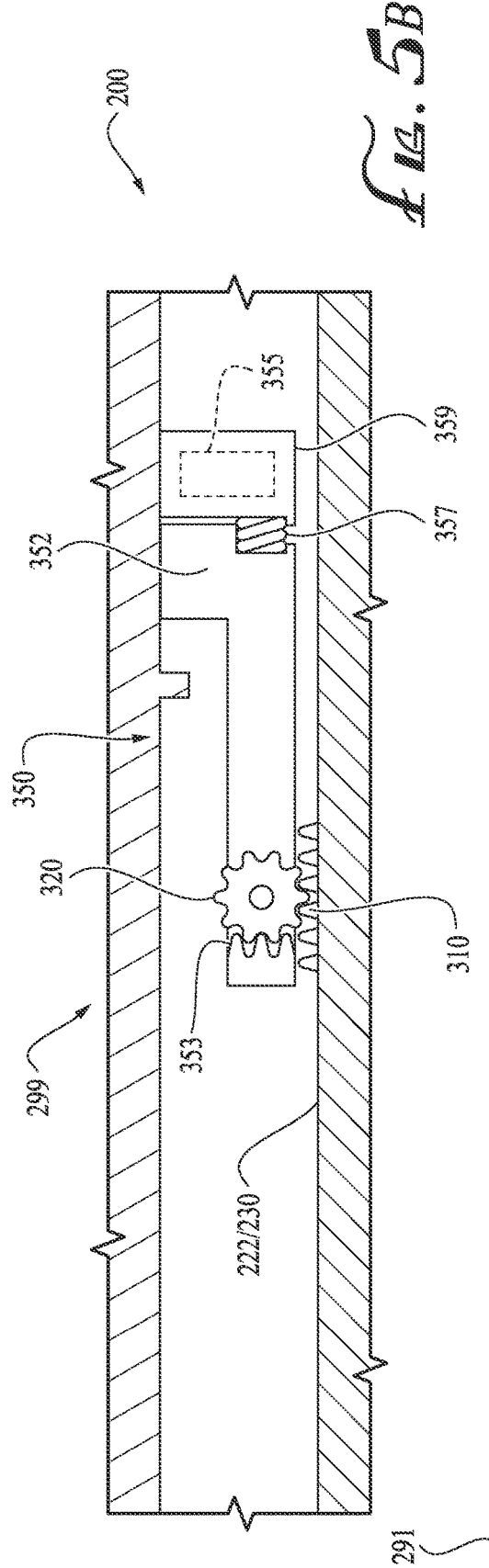

DOWNHOLE SAFETY VALVE WITH ELECTRO-MAGNETIC TOOTH BRAKE SYSTEM

CROSS-REFERENCE TO RELATED APPLICATIONS

Not applicable.

STATEMENT REGARDING FEDERALLY SPONSORED RESEARCH OR DEVELOPMENT

Not applicable.

FIELD

This disclosure relates generally to safety valves. More particularly, this disclosure relates to electro-magnetic safety valves for use in downhole operations such as hydrocarbon production.

BACKGROUND

Well safety valves may be installed in a wellbore to prevent uncontrolled release of reservoir fluids. For example, safety valves may be configured to close if there is a failure situation in the system that could lead to uncontrolled release of reservoir fluids. A safety valve should ideally close as quickly and/or reliably as possible during a process upset or in the event of an emergency, to ensure operational and environmental safety. While there are different types of safety valves, electric safety valves may be configured to automatically close in the event of loss of power.

BRIEF DESCRIPTION OF THE DRAWINGS

For a more complete understanding of the present disclosure, reference is now made to the following brief description, taken in connection with the accompanying drawings and detailed description, wherein like reference numerals represent like parts. These drawings illustrate certain aspects of some examples of the present disclosure and should not be used to limit or define the disclosure.

FIG. 2A is a schematic cross-section of an exemplary safety valve in a first closed position, according to an embodiment of the disclosure;

FIG. 2B is a schematic cross-section of the safety valve of FIG. 2A in a second closed position, according to an embodiment of the disclosure;

FIG. 2C is a schematic cross-section of the safety valve of FIG. 2A in an open position, according to an embodiment of the disclosure;

FIG. 2AA is a schematic cross-section of an alternate safety valve embodiment in a first closed position, according to an embodiment of the disclosure;

FIG. 2AB is a schematic cross-section of the safety valve of FIG. 2AA in a second closed position, according to an embodiment of the disclosure;

FIG. 2AC is a schematic cross-section of the safety valve of FIG. 2AA in an open position, according to an embodiment of the disclosure;

FIG. 5A is a schematic illustration of yet another electro-magnetic tooth brake system in a disengaged state, according to an embodiment of the disclosure; and FIG. 5B is a schematic illustration of the electro-magnetic tooth brake system of FIG. 5A in an engaged state, according to an embodiment of the disclosure.

DETAILED DESCRIPTION

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein the terms "uphole", "upwell", "above", "top", and the like refer directionally in a wellbore towards the surface, while the terms "downhole", "downwell", "below", "bottom", and the like refer directionally in a wellbore towards the toe of the wellbore (e.g. the end of the wellbore distally away from the surface), as persons of skill will understand. Orientation terms "upstream" and "downstream" are defined relative to the direction of flow of fluid. "Upstream" is directed counter to the direction of flow of fluid, while "downstream" is directed in the direction of flow of fluid, as persons of skill will understand.

Figure 1:
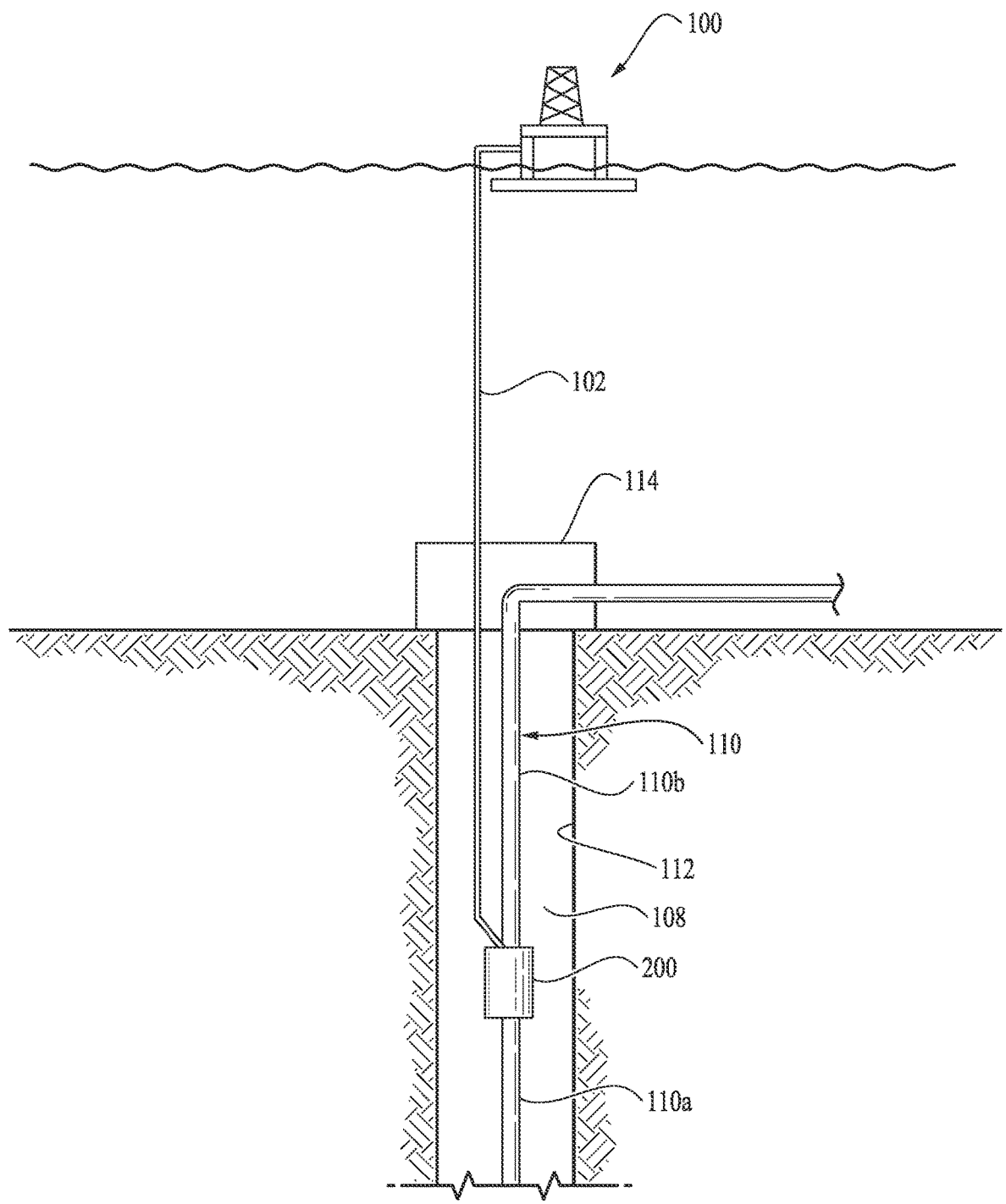
FIG. 1 is a diagram of an exemplary offshore well having an illustrative safety valve, according to an embodiment of the disclosure.

FIG. 1 illustrates an offshore platform 100 connected to an electrically controlled safety valve 200 via electrical connection 102. An annulus 108 may be defined between walls of well 112 and a conduit 110. Wellhead 114 may provide a means to hand off and seal conduit 110 against well 112 and/or provide a profile to latch a subsea blowout preventer to. Conduit 110 may be coupled to wellhead 114. Conduit 110 may be any conduit such as a casing, liner, production tubing, or other tubulars disposed in a wellbore. In the following description of electrically controlled safety valve 200 and other apparatus and methods described herein, directional terms, such as "above", "below", "upper", "lower", etc., are used only for convenience in referring to the accompanying drawings. Additionally, it is to be understood that the various examples of the present electrically controlled safety valve described herein may be utilized in various orientations, such as inclined, inverted, horizontal, vertical, etc., and in various configurations, without departing from the principles of the present disclosure. Although electrically controlled safety valve 200 is illustrated as being disposed within an offshore well, one of ordinary skill in the art will appreciate that electrically controlled safety valve 200 may be disposed in any type of wellbore, including onshore and offshore type wellbores, without deviating from the present disclosure. Furthermore, while electrical connection 102 is illustrated as being connected to an offshore platform, electrical connection 102 may be connected to any type of completion or other element without departing from the disclosure.

Electrically controlled safety valve 200 may be interconnected in conduit 110 and positioned in well 112. Electrically controlled safety valve 200 may provide a means to isolate a lower portion of conduit 110 from an upper portion of conduit 110. The lower portion of conduit 110 (which is labeled 110a in FIG. 1) may be fluidically connected to a subterranean formation such that formation fluids may flow into the lower portion of conduit 110. Electrical connection 102 may extend into the well 112 and may be connected to electrically controlled safety valve 200. Electrical connection 102 may provide power to an electromagnet disposed within electrically controlled safety valve 200, for example as discussed in more detail below. As will be described in further detail below, power provided to the electromagnet may energize/engage the electromagnet to hold components of electrically controlled safety valve 200 in place, for example when electrically controlled safety valve 200 is actuated into an open position. Actuation may include opening electrically controlled safety valve 200 to provide a flow path for wellbore fluids in a lower portion 110a of conduit 110 to flow into an upper portion 110b of conduit 110. Electrical connection 102 may also provide a means to close electrically controlled safety valve 200 and isolate a lower portion 110a of conduit 110 to flow from an upper portion 110b of conduit 110 to provide well control.

Referring to FIG. 2A, an example of an electrically controlled safety valve 200 is illustrated in a first closed position. Electrically controlled safety valve 200 may include body/outer housing 224 containing a longitudinally/axially extending bore 225 therein (e.g. disposed along the centerline 291 of the outer housing 224), wherein components of the electrically controlled safety valve may be disposed within bore 225. In some embodiments, upper valve assembly 234 may be attached to outer housing 224 (e.g. rigidly anchoring elements mounted thereon to prevent axial movement) and may further include sealing element 223 in some embodiments, for example such that fluid communication from lower section 202 (of the bore) to upper section 203 (of the bore) is prevented (except by fluid flow through the valve flow path 214). In some embodiments, a sealing element may be disposed on lower valve assembly 216. In some embodiments, sleeve 226 may be attached to upper valve assembly 234 and to lower valve assembly 216 (which may also be attached/anchored to the outer housing 224 in some embodiments). Flow tube 240 may be disposed within sleeve 226 and/or the outer housing 224. In embodiments, flow tube 240 may include a translating sleeve 222 and a flow tube main body 208. In embodiments, the flow tube main body 208 may be disposed within (e.g. radially inward of) the translating sleeve and/or may be configured for axial movement (e.g. telescoping movement) to slide within the translating sleeve 222 (e.g. between the first position shown in FIG. 2A and the second position shown in FIG. 2B). For example, at least a portion of the flow tube main body 208 may be disposed within the translating sleeve 222 (e.g. at least flow tube shoulder 232 may be disposed within the translating sleeve 222), and the portion of the flow tube main body 208 extending out of the translating sleeve 222 may vary in length (for example, with more of the flow tube main body 208 extending out of the translating sleeve 222 in the position shown in FIG. 2B than in either FIG. 2A or FIG. 2C). A flow path 214 may be defined by an interior of flow tube main body 208 and/or translating sleeve 222. As illustrated in FIG. 2A, flow path 214 may extend from an interior of conduit 206 through an interior of flow tube main body 208. As will be discussed in further detail below, when electrically controlled safety valve 200 is in an open position (e.g. as shown in FIG. 2C, for example), flow path 214 may extend from an interior of conduit 206 through an interior of flow tube main body 208 and further into lower section 202.

Power spring 210 (e.g. the outer spring in FIG. 2A) may be disposed between lower valve assembly 216 and translating sleeve shoulder 218. As illustrated in FIG. 2A, translating sleeve shoulder 218 and flow tube shoulder 232 may be in contact when electrically controlled safety valve 200 is in the first closed position. Power spring 210 may provide a positive spring force against translating sleeve shoulder 218 which may keep flow tube main body 208 and/or translating sleeve 222 in a first position. Power spring 210 may also provide a positive spring force (e.g. bias) to return flow tube main body 208 and/or translating sleeve 222 to the first position from a second position as will be explained below. So in some embodiments, the power spring 210 may be configured to bias the translating sleeve 222 towards the first position (of FIG. 2A, for example) when the translating sleeve 22 is in the second position (e.g. as shown in FIGS. 2B-C). In some embodiments, a nose spring 212 may be configured to bias the flow tube main body 208 towards the open position (e.g. as shown in FIG. 2C) when the translating sleeve is in the second position (e.g. as shown in FIG. 2B). For example, the nose spring 212 (e.g. the inner spring in FIG. 2A) may be disposed between translating sleeve assembly 230 (or in some embodiments a portion of the translating sleeve 222) and flow tube shoulder 232.

One or more piston 220 may be configured so that when activated, the piston 220 extends to move the translating sleeve 222 from its first position (e.g. as shown in FIG. 2A, for example with the translating sleeve distal to the valve 204 and/or in its uphole position) to its second position (e.g. as shown in FIG. 2B, for example closer to/proximal to the valve 204 and/or in its downhole position). For example, the translating sleeve assembly 230 may be disposed between and attached (e.g. rigidly coupled in the axial direction) to piston 220 and translating sleeve 222. Although only one piston 220 is illustrated in FIGS. 2A-2C, there may be multiple pistons attached to translating sleeve 222.

Power spring 210 and nose spring 212 are depicted as coiled springs in FIGS. 2A-2C. However, power spring 210 and nose spring 212 may include any kind of spring such as, for example, coil springs, wave springs, or fluid springs. Translating sleeve assembly 230 may be configured to allow a force applied to a distal end of piston 220 to be transferred into translating sleeve 222. In some embodiments, a force may be applied to the distal end of piston 220 hydraulically by way of fluid communication from channel 228 through orifice 242 (e.g. fluid pressure from downhole, such as below the flapper valve 204, may be applied to drive the piston 220). In alternate embodiments, a force may be applied to piston 220 hydraulically from the surface or by an electric motor or electric pump. A force applied to piston 220 may move translating sleeve 222 from its first position (as shown in FIG. 2A) to its second position (as shown in FIG. 2B). Nose spring 212 may provide a positive spring force against translating sleeve assembly 230 and flow tube shoulder 232 which may be configured to move translating sleeve 222 from the second position to the first position and/or to move flow tube main body 208 towards the valve 204 (e.g. from its first position, as shown in FIGS. 2A and 2B—for example distal to the valve 204 and/or uphole of the valve, to its second position, as shown in FIG. 2C—for example extending through the valve 204 and/or downhole), as will be discussed in greater detail below.

In the first closed position of the safety valve 200 (as shown in FIG. 2A), translating sleeve 222 and flow tube main body 208 are positioned such that translating sleeve shoulder 218 and flow tube shoulder 232 are in contact (e.g. with interference fit retaining the flow tube main body 208 within the end of the translating sleeve 222) and power spring 210 and nose spring 212 are in an extended (e.g. non-contracted) position (e.g. applying no or minimal biasing force). In the first closed position of the safety valve 200 (as shown in FIG. 2A), translating sleeve 222 may be referred to as being in its first position and flow tube 208 may be referred to as being in its first position.

Electrically controlled safety valve 200 may be disposed in a wellbore as part of a wellbore completion string. The wellbore may penetrate a subterranean formation that contains formation fluids such as oil, gas, water, or any combination thereof. Formation fluids may flow from the subterranean formation into the wellbore and thereafter into a lower portion of conduit 110 as discussed above. Lower section 202 of the safety valve 200 may be configured to be fluidically coupled to a lower portion of conduit 110 and therefore may be exposed to formation fluids and pressure as a function of being in fluid communication with fluids present in the wellbore. Lower section 202 may be fluidically coupled to a production tubing string disposed in the wellbore, for example. In the first closed position of the safety valve 200 (as shown in FIG. 2A), valve 204 may be in a closed position (e.g. blocking fluid flow through the bore 225, for example to prevent fluid from lower section 202 from passing to conduit 206), thereby isolating lower section 202 from flow tube main body 208 and/or conduit 206. When valve 204 is in a closed position as in FIG. 2A, valve 204 may prevent formation fluids and pressure from flowing into flow tube main body 208. Although FIG. 2A illustrates valve 204 as a flapper valve, valve 204 may be any suitable type of valve such as a flapper type valve or a ball type valve, for example. As will be illustrated in further detail below, valve 204 may be actuated into an open position to allow formation fluids to flow from lower section 202 through a flow path 214 defined by lower section 202, an interior of flow tube main body 208 and an interior of conduit 206. Conduit 206 may be configured to be coupled to an upper portion of conduit 110, as shown in FIG. 1.

When electrically controlled safety valve 200 is in the first closed position (see FIG. 2A), no amount of differential pressure across valve 204 will allow formation fluids to flow from lower section 202 into flow path 214. In the first closed position, electrically controlled safety valve 200 will only allow fluid flow from conduit 206 into lower section 202, but not from lower section 202 into conduit 206 (e.g. the valve 204 operates as a one-way valve, only allowing flow downhole). In the instance that pressure in conduit 206 is increased, valve 204 will remain in the closed position until the pressure in conduit 206 is increased above the pressure in lower section 202 plus the closing pressure provided by any biasing of the valve 204 (such as flapper spring 205, which may be configured to bias the flapper valve 204 closed), sometimes referred to herein as valve opening pressure. When the valve opening pressure is reached, valve 204 may open and allow fluid communication from conduit 206 into lower section 202. In this manner treatment fluids such as surfactants, scale inhibitors, hydrate treatments, and other suitable treatment fluids may be introduced into the subterranean formation. The configuration of electrically controlled safety valve 200 may allow treatment fluids to be pumped from a surface, such as a wellhead, into the subterranean formation without actuating a control line or balance line to open the valve. Once pressure in conduit 206 is decreased below the valve opening pressure, flapper spring 205 may cause valve 204 to return to the closed position, and flow from conduit 206 into lower section 202 may cease. When valve 204 has returned to the closed position, flow from lower section 202 into flow path 214 may be prevented. Should a pressure differential across valve 204 be reversed such that pressure in lower section 202 is greater than a pressure in conduit 206, valve 204 may remain in a closed position such that fluids in the lower section 202 are prevented from flowing into conduit 206. This configuration is shown in FIG. 2A.

With reference to FIG. 2B electrically controlled safety valve 200 is illustrated in its second closed position. In the second closed position, translating sleeve 222 may be displaced from its first position to its second position, which is relatively closer in proximity to valve 204 (e.g. shifted downhole). Flow tube main body 208, however, may remain in its first position due to pressure differential below the valve 204. For example, translating sleeve 222 may slide downhole with respect to flow tube main body 208 (for example, with less of the length of flow tube main body 208 extending out of the translating sleeve 222). When the electrically controlled safety valve 200 is in the second closed position (as shown in FIG. 2B), both power spring 210 and nose spring 212 may be in a compressed state.

In some embodiments, hydraulic pressure may be used to translate the translating sleeve 222 from its first position to its second position. For example, to move translating sleeve 222 to its second position, differential pressure across valve 204 may be increased by lowering pressure in conduit 206 or increasing pressure in lower section 202. Lowering pressure in conduit 206 or increasing pressure in lower section 202 may cause fluid from lower section 202 to flow through channel 228 defined between sleeve 226 and outer housing 224 into orifice 242. Orifice 242 may allow fluid communication into piston tube 244, whereby fluid pressure may act on the proximal (e.g. uphole) end of piston 220. The force exerted by fluid pressure on the proximal end of piston 220 may displace/extend piston 220 towards valve 204 by transferring the force through piston 220, translating sleeve assembly 230, and translating sleeve shoulder 218 (e.g. axially moving translating sleeve 222). Nose spring 212 may provide a spring/biasing force against flow tube shoulder 232 and translating sleeve assembly 230 (e.g. due to being in its compressed state, in which the force of nose spring 212 is oriented to drive flow tube shoulder 232 away from translating sleeve assembly 230 and/or to drive flow tube main body 208 downhole towards the valve 204 and/or axially away from the translating sleeve 222) and power spring 210 may provide a spring force against translating sleeve shoulder 218 and lower valve assembly 216 (e.g. due to being in its compressed state, in which the force of the power spring 210 is oriented to drive translating sleeve shoulder 218 away from lower valve assembly 216 and/or to drive translating tube 222 uphole and/or axially away from the valve 204). Although not illustrated in FIGS. 2A-2C, flow tube main body 208 may include channels in some embodiments that allow pressure and/or fluid communication between flow path 214 and an interior of sleeve 226. Collectively the spring forces from power spring 210 and nose spring 212 may resist the movement of piston 220 until the differential pressure across valve 204 is increased beyond the spring force provided from power spring 210 and nose spring 212. For example, in FIG. 2B increasing differential pressure may include decreasing pressure in flow tube 206 such that pressure in lower section 202 is relatively higher than the pressure in flow tube 206. When the differential pressure across valve 204 is increased, the differential pressure across piston 220 also increases in FIG. 2B. When the differential pressure across valve 204 is increased beyond the spring force provided by nose spring 212 and power spring 210, nose spring 212 and power spring 210 may compress and allow translating sleeve 222 to move into its second position. Differential pressure across valve 204 may be increased by pumping fluid out of conduit 206, for example. In the instance that lower section 202 is fluidically coupled to a non-perforated section of pipe or where there is a plug in a conduit fluidically coupled to lower section 202 that prevents pressure being transmitted from lower section 202 to piston 220, a pressure differential across valve 204 may be induced through pipe swell.

In the second closed position (e.g. as shown in FIG. 2B), electrically controlled safety valve 200 remains safe, as no fluids from lower section 202 can flow into flow path 214. In the second closed position, no amount of differential pressure across valve 204, when the differential pressure is caused by relatively higher pressure in lower section 202 and relatively lower pressure in conduit 206, should cause valve 204 to open to allow fluids from lower section 202 to flow into flow path 214, as the pressure from lower section 202 is acting on valve 204. If pressure is increased in conduit 206, the differential pressure across valve 204 decreases and translating sleeve 222 may move back to the first position illustrated in FIG. 2A (for example, since the force applied to the piston 220 may be less than the spring forces). Unlike conventional safety valves which generally require a control line to supply pressure to actuate a piston to move a translating sleeve, the electrically controlled safety valve 200 of FIGS. 2A-C may only require pressure supplied by the wellbore fluids in lower section 202 to move the translating sleeve.

With continued reference to FIG. 2B, an electro-magnetic tooth brake system 299 may be configured to lock/axially fix the translating sleeve 222 in place within the outer housing 224. For example, the electro-magnetic tooth brake system 299 may be configured so that when engaged/activated/powered, the translating sleeve 222 disposed in its second position may be held in its second position. As illustrated, when translating sleeve 222 is moved from its first position to its second position, the electro-magnetic tooth brake system 299 (which will be described below in more detail with respect to FIGS. 3A-B, for example) may be positioned for activation (e.g. with the rack teeth 310 meshing with the pinion 320, and the brake teeth 353 and electromagnet 355 in proximity to the pinion 320, for example axially disposed so that activation of the electromagnet 355 may draw the brake teeth 353 into mesh (e.g. either directly or indirectly) with the pinion 320). After translating sleeve 222 is allowed to come to the second position as described above (e.g. due to movement of piston 220), the electro-magnetic tooth brake system 299 may be powered on (e.g. activated by supplying power to the electromagnet 355). In some embodiments, power may be supplied from the surface. Powering electro-magnetic tooth brake system 299 may axially lock/fix the translating sleeve 222 in place within the outer housing 224 (e.g. in its second position). For example, the electro-magnetic tooth brake system 299 may be configured so that when engaged/activated, it prevents axial translation of the translating sleeve 222 from its second position to its first position (and when not engaged, the electro-magnetic tooth brake system 299 does not restrain axial movement of the translating sleeve 222). Thus, the electro-magnetic tooth brake system 299 may be operable/configured to maintain the translating sleeve 222 in its second position when engaged—e.g. with power to the electromagnet 355 generating magnetic force.

It should be understood that FIG. 2A illustrates an exemplary location for the electro-magnetic tooth brake system 299. This example is not limiting, and persons of skill will understand this and other locations and interactions for exemplary electro-magnetic tooth brake systems. By way of example, FIGS. 2AA-2AC illustrate another possible location for the electro-magnetic tooth brake system 299, shown here schematically as a black-box which can stand-in for an exemplary electro-magnetic tooth brake system 299. It should be understood that the exemplary tooth brake system 299 may be that of FIG. 3A, FIG. 4, FIG. 5A, or other relevant embodiments. Additionally, FIG. 2AA illustrates an alternate embodiment of flow tube main body 208, in which flow tube main body 208 comprises two separate pieces interacting to form a whole (e.g. with the uphole piece 208a extending into the downhole piece 208b). In embodiments, the uphole piece 208a may be fixed to translating sleeve assembly 230, so that the uphole piece 208a and translating sleeve assembly 230 move axially together. As persons of skill will understand, the embodiment shown in FIGS. 2AA-2AC operates substantially the same as that of FIG. 2A, having a first closed position as shown in FIG. 2AA, a second closed position as shown in in FIG. 2AB, and an open position as shown in FIG. 2AC.

Figure 3A:
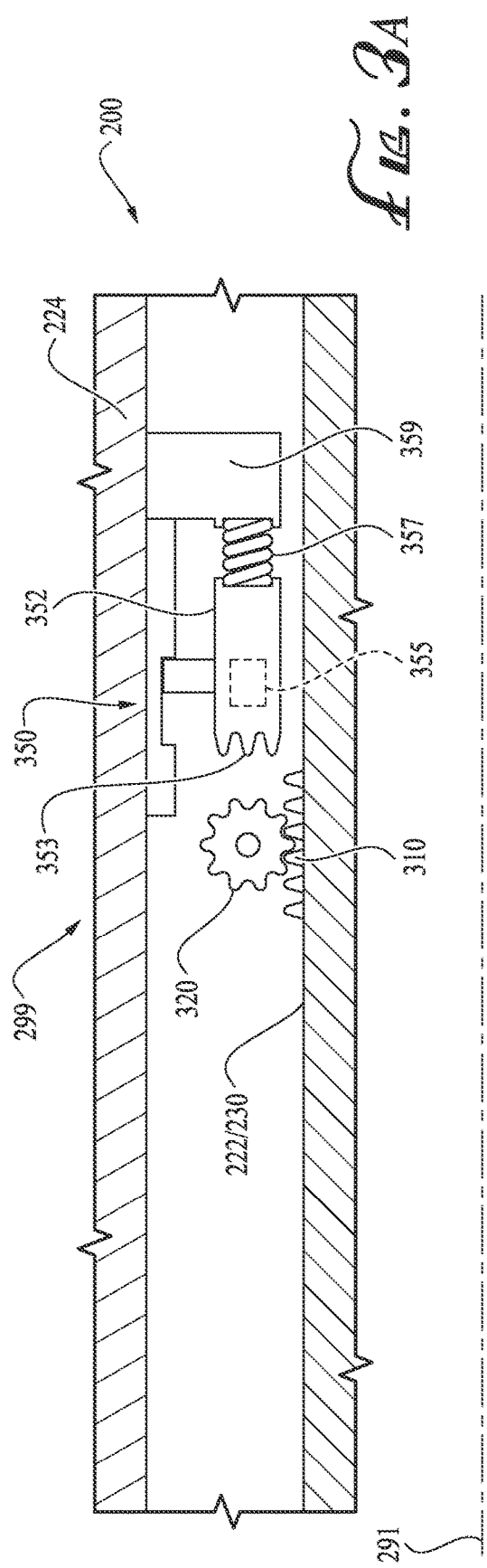
FIG. 3A is a schematic illustration of an exemplary electro-magnetic tooth brake system, of the sort which may be used in the safety valve of FIG. 2A, in a disengaged state, according to an embodiment of the disclosure.
Figure 3B:
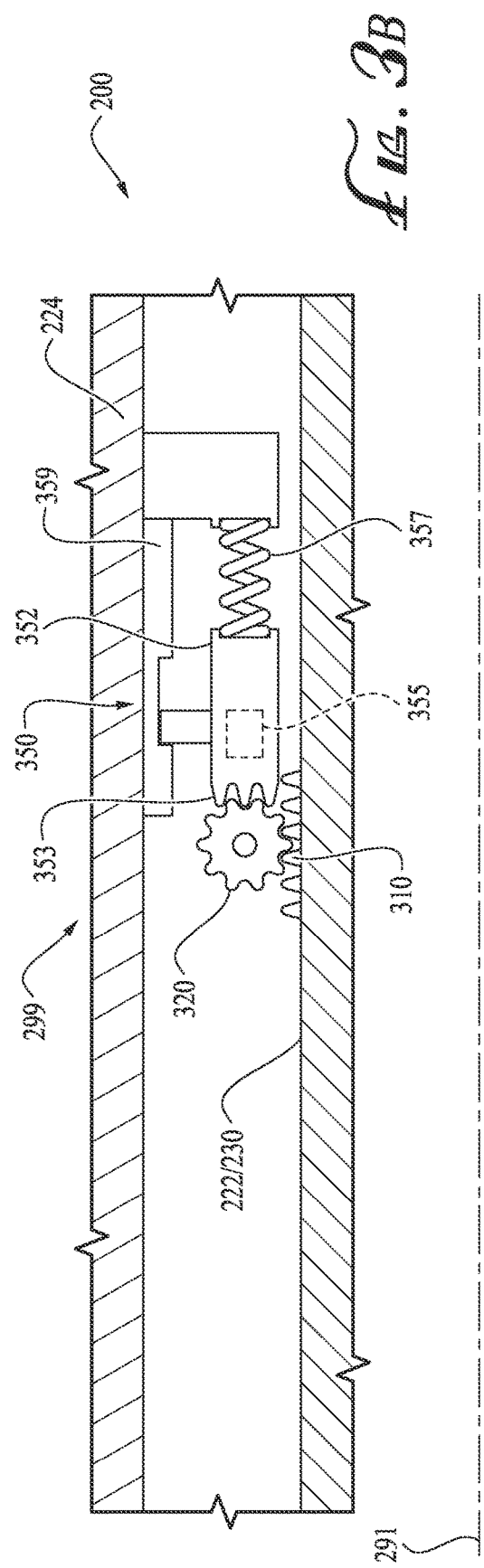
FIG. 3B is a schematic illustration of the electro-magnetic tooth brake system of FIG. 3A in an engaged state, according to an embodiment of the disclosure.

As shown in FIGS. 3A-B, the electro-magnetic tooth brake system 299 may comprise a plurality of rack teeth 310 coupled to the translating sleeve 222 (e.g. directly coupled, such as mounted or directly machined on an exterior surface of the translating sleeve 222, or indirectly coupled, for example mounted or directly machined on a translating sleeve assembly 230, which may be fixed to the translating sleeve 222—for example with the axial translation of the translating sleeve 222 and the translating sleeve assembly 230 being linked), a pinion 320 (e.g. gear, for example having pinion teeth) mounted and/or fixed axially within the outer housing 224 and configured with pinion teeth intermeshing with the rack teeth 310 (e.g. which are coupled to the translating sleeve 222) when the translating sleeve 222 is in its second position, and an electric tooth brake 350. In embodiments, the electric tooth brake 350 may comprise a body 352 operable to slide/translate axially within the bore 225 (e.g. slidingly mounted within the outer housing 224), one or more (e.g. typically a plurality of) brake teeth 353 disposed on the body 352 and configured/oriented to engage (e.g. either directly or indirectly) the pinion 320 (e.g. in FIG. 3B with brake teeth 353 meshing with pinion 320 teeth) when the electro-magnetic tooth brake 350 is engaged (e.g. the electromagnet 355 is powered and the translating sleeve 222 is in its second position), an electro-magnet 355 configured to draw the brake teeth 353 on body 352 towards the pinion 320 (e.g. with brake teeth 353 engaging/meshing with the teeth of the pinion 320) when engaged/powered, and a brake biasing member 357 (e.g. brake spring) configured to bias the teeth on body 352 away from the pinion 320 (e.g. to retract the body 352 and disengage the brake teeth 353 from the pinion 320 when the electro-magnet 355 is not engaged/powered).

In some embodiments, the electromagnet 355 may be disposed on or in the body 352. In some embodiments, the electromagnet 355 may be configured to generate a magnetic force capable of engaging the brake teeth 353 to lock/prevent rotation of the pinion 320 (thereby locking the axial position of the translating sleeve 222). In some embodiments, the electromagnet 355 may comprise at least one coil, and the at least one coil can be operable to generate the magnetic force to hold the translating sleeve 222 axially in place. In embodiments, there may be any number of coils in any orientation to fix translating sleeve assembly 230 and/or translating sleeve 222 axially in place. When a current is passed through the one or more electromagnetic coils, a magnetic force may be generated that attracts the electromagnetic coils to a magnetically attractive target. For example, in FIGS. 3A-B, the target may be the pinion 320 (and/or gearbox 410 in FIG. 4). The one or more electromagnetic coils may be disposed within and fixedly attached to body 352. Body 352 may be encapsulated or clad in a second material in order to minimize corrosion and/or to isolate the coils from wellbore fluids. In some embodiments, a plurality of electromagnetic coils may be wired in parallel or in series, such that if one of the plurality of electromagnetic coils fails by short circuiting or experiences an open circuit, the remaining of the plurality of electromagnetic coils may function normally, i.e., the remaining plurality of electromagnetic coils may be considered a redundant coil system.

It should be understood that FIGS. 3A-B illustrate an exemplary electro-magnetic tooth brake system 299. This example is not limiting, and persons of skill will understand this and other embodiments of the electro-magnetic tooth brake system based on this disclosure. By way of example, FIGS. 5A-B illustrate an alternate exemplary electro-magnetic tooth brake system 299 embodiment. In the embodiment of FIG. 5A, the electro-magnet 355 may be fixed to the housing 224 (e.g. so as to be stationary and/or not have axial movement). For example, the electro-magnet 355 may be disposed on or in a support body 359 which is fixedly mounted to the housing 224. In embodiments, support body 359 may be encapsulated or clad in a second material in order to minimize corrosion and isolate the coils from wellbore fluids. The brake teeth 353 in FIG. 5A may be mounted on body 352, which in this embodiment may be configured to move axially (e.g. based on the action of the electro-magnet 355 and/or brake biasing member 357) based on power supplied. For example, in FIG. 5A (e.g. the disengaged position) the brake teeth 353 are disposed beyond the pinion 320, distal to the electro-magnet 355 (e.g. due to the shape of body 352, having an arm extending beyond the pinion 320) and oriented towards the pinion 320. When the electro-magnet 355 is powered, the electro-magnet 355 attracts body 352 towards support body 359, pulling the brake teeth 353 towards and engaging the pinion 320 while compressing the brake biasing member 357 (e.g. the engaged position, as show in in FIG. 5B). Thus, the target of the electro-magnet 355 may be body 352, for example to draw the brake teeth 353 towards the electro-magnet 355 and/or into mesh with the pinion 320. When de-powered, the brake biasing member 357 moves the brake teeth 353 out of meshing engagement with the pinion 320 (e.g. back to the initial position shown in FIG. 5A).

The electromagnet 355 may be configured to apply magnetic force in a substantially axial direction, for example. The force applied by the electromagnet 355 may be any amount of force, including but not limited to, a force in a range of about 45 Newtons to about 45000 Newtons. When the electro-magnetic tooth brake system 299 is switched/powered on (e.g. activated/engaged), translating sleeve assembly 230 and/or translating sleeve 222 in its second position may become fixed in place (e.g. axially within the outer housing 224), thereby preventing translating sleeve 222 from moving from its second position back to its first position. Electromagnets may provide a means to hold translating sleeve 222 at any well depth. By using the electro-magnetic tooth brake system 299 described herein, only well pressure may be required to open electrically controlled safety valve 200. Again, when translating sleeve 222 is in the second position either when electro-magnetic tooth brake system is switched on or switched off, no amount of differential pressure across valve 204 will open valve 204, when the differential pressure is generated by a pressure difference between a relatively higher pressure in section 202 and a relatively lower pressure in conduit 206.

Figure 4:
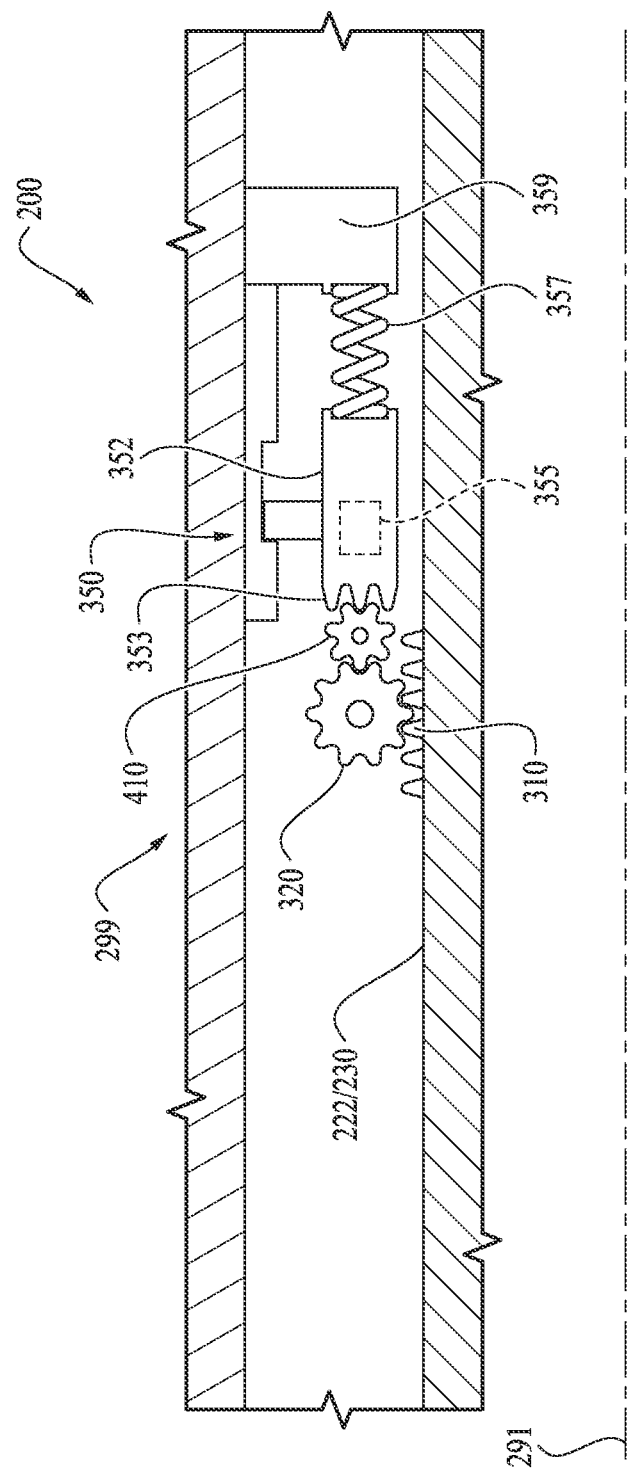
FIG. 4 is a schematic illustration of another electro-magnetic tooth brake system, according to an embodiment of the disclosure.

Some embodiments of the electric tooth brake 350 may further comprise a rail mount 359 configured to hold/secure/attach (e.g. radially fix) the body 352 to the inner surface of the outer housing 224 (e.g. to the surface of the bore 225) while allowing sliding translation of the body 352 axially within the bore 225 (e.g. axially along a rail disposed on the inner surface of the outer housing 224). Optionally, some embodiments may further comprise a gear box 410 (e.g. one or more intermediate gear, as illustrated in FIG. 4) disposed between (and with teeth intermeshing with those of) the brake teeth 353 and/or the pinion 320. For example, the gear box 410 may be axially fixed in the outer housing 224 so that its teeth mesh with those of the pinion 320, and when the electromagnet 355 is engaged, the brake teeth 353 may also engage (e.g. mesh with) the teeth of the gear box 410 (e.g. with the gear box 410 providing indirect meshing of the teeth of the pinion 320 with the brake teeth 353). In embodiments, the gear box 410 may be configured with gear reduction, which may allow less electromagnetic force to effectively hold/lock the position of the translating sleeve 222 (e.g. resisting the biasing force, for example from the power spring 210, configured to move the translating sleeve 222 to the first/uphole position).

With reference to FIG. 2C, electrically controlled safety valve 200 is illustrated in an open position (e.g. with the flapper valve 204 open, so that there can be fluid communication either direction, including uphole through the valve 204 to conduit 206 and then further uphole). When electrically controlled safety valve 200 is in the open position, translating sleeve 222 may be fixed in place in its second position as in FIG. 2B through the force provided by the electro-magnetic tooth brake system 299. Flow tube main body 208 is illustrated as being axially shifted from its first position illustrated in FIGS. 2A and 2B to its second position as shown in FIG. 2C. When flow tube main body 208 is in the second position, flow tube shoulder 232 and translating sleeve shoulder 218 may be in contact and flow tube main body 208 may have displaced valve 204 into an open position. For example, the flow tube main body 208 may extend downhole through the flapper valve 204 to hold open the flapper valve 204. Nose spring 212 may be in an uncompressed state (e.g. having driven the flow tube main body 208 downhole), while power spring 210 may be in a compressed state (e.g. still providing biasing force directed to move the translating sleeve 222 uphole and/or away from the valve 204). The power spring 210 is resisted and held in its compressed state by the electro-magnetic tooth brake system 299 being activated.

Flow tube main body 208 may be moved from its first position to its second position (e.g. extending through the valve 204 and/or placing the safety valve 200 in its open position/configuration) when translating sleeve 222 is fixed in place in the second position by the electro-magnetic tooth brake system 299 as described above. When translating sleeve 222 is fixed in its second position through the force provided by electromagnet 355, nose spring 212 may provide a positive spring force against flow tube shoulder 232 and translating sleeve assembly 230. The positive spring force from nose spring 212 may be transferred through flow tube main body 208 into valve 204. In this state, flow tube main body 208 will not move to its second position until differential pressure across valve 204 is decreased after translating sleeve 222 is fixed in position. In some embodiments, differential pressure may be decreased by pumping into conduit 206 thereby increasing the pressure in conduit 206. Pressure may be increased in conduit 206 until the differential pressure across valve 204 is decreased to a point where the positive spring force from nose spring 212 is greater than the differential pressure across valve 204. Thereafter, nose spring 212 may extend and move flow tube main body 208 into its second position by acting on acting on translating sleeve assembly 230 and flow tube shoulder 232 (thereby driving the flow tube main body 208 downhole towards and through the valve 204). When flow tube main body 208 is in its second position, the valve 204 is open and fluids such as oil and gas in lower section 202 may be able to flow into flow path 214 and to a surface of the wellbore such as to a wellhead (for example, when pressure uphole is decreased). Electrically controlled safety valve 200 may remain in the open position defined by translating sleeve 222 being in its second position and flow tube 208 being in its second position (e.g. as shown in in FIG. 2C) while the electro-magnetic tooth brake system 299 remains powered on/activated/engaged.

Electrically controlled safety valve 200 may be moved back to the first closed position as illustrated in FIG. 2A by powering off/disengaging/deactivating the electro-magnetic tooth brake system 299. As previously discussed, the electro-magnetic tooth brake system 299 may fix translating sleeve assembly 230 and/or translating sleeve 222 in place in its second position when the electro-magnetic tooth brake system 299 remains powered on. When electro-magnetic tooth brake system 299 is powered off (e.g. loses power), translating sleeve assembly 230 and/or translating sleeve 222 may no longer be fixed in place axially. Power spring 210 may then provide a positive spring force against lower valve assembly 216, translating sleeve shoulder 218, and flow tube shoulder 232 through contact between translating sleeve shoulder 218 and flow tube shoulder 232. The positive spring force from power spring 210 may axially displace translating sleeve 222 back to its first position and flow tube main body 208 to its first position, thereby returning electrically controlled safety valve 200 to the first closed position illustrated in FIG. 2A. In some embodiments, translation of the translating sleeve back to the first position may disengage rack teeth 310 from the pinion 320 (although in other embodiments, the rack teeth may extend axially sufficiently to remain engaged in both the first and second position of the translating sleeve 222).

In some embodiments, the pinion 320 and/or gearbox 410 may be disposed in clean (e.g. hydraulic) fluid, e.g. within a gearbox housing. In some embodiments, the pressure in such a gearbox housing may be equalized with external pressure or there may be positive pressure in the gearbox housing, for example to minimize particulate intrusion of the sort that could exacerbate gear wear.

Additional Disclosure

The following are non-limiting, specific embodiments in accordance with the present disclosure:

In a first embodiment, a safety valve comprises: an outer housing having a longitudinal bore therethrough (e.g. extending axially through the outer housing, for example along the longitudinal centerline); a valve (e.g. disposed in the outer housing) having an open position and a closed position, wherein the valve is biased closed (e.g. towards the closed position); a translating sleeve disposed within the outer housing (e.g. within the longitudinal/central bore) and configured to move axially between a first position (e.g. disposed uphole and/or away from and/or distal to the valve) and a second position (e.g. disposed downhole and/or closer to and/or proximal to the valve), wherein the translating sleeve is biased towards the first position when disposed in the second position; and an electro-magnetic tooth brake system operable/configured to maintain the translating sleeve in the second position when engaged (e.g. with power to an electromagnet generating magnetic force) (e.g. configured so that when engaged, it prevents translation of the translating sleeve from the second position to the first position, and when not engaged, the translating sleeve is free to move axially, for example due to biasing and/or for example from the second position to the first position).

A second embodiment can include the safety valve of the first embodiment, wherein the valve comprises a flapper valve.

A third embodiment can include the safety valve of the first or second embodiments, wherein the closed position closes the bore and/or prevents fluid flow/fluid communication from below the flapper to above the flapper (e.g. through the bore), and the open position allows fluid flow/fluid communication (e.g. through the bore).

A fourth embodiment can include the safety valve of any one of the first to third embodiments, wherein the valve is configured so that in the open position, fluid flow therethrough is allowed (e.g. there is fluid communication therethrough), and in the closed position, fluid flow therethrough is blocked (e.g. there is no fluid communication therethrough).

A fifth embodiment can include the safety valve of any one of the first to fourth embodiments, wherein the electro-magnetic tooth brake system comprises: a plurality of teeth (e.g. rack teeth) coupled to the translating sleeve; a pinion (e.g. gear) mounted, fixed, and/or disposed within the outer housing and configured with pinion teeth intermeshing with the plurality of (e.g. rack) teeth when the translating sleeve is in the second position; and an electric tooth brake.

A sixth embodiment can include the safety valve of the fifth embodiment, wherein the plurality of teeth (e.g. rack teeth) may be directly coupled, such as mounted on an exterior surface of the translating sleeve (e.g. disposed on the translating sleeve), or indirectly coupled, for example mounted on a translating sleeve assembly, which is fixed to and/or moves axially with the translating sleeve.

A seventh embodiment can include the safety valve of any one of the fifth to sixth embodiments, wherein the electric tooth brake comprises: a body operable to slide/translate axially within the bore (e.g. mounted/fixed (e.g. radially) within the bore of the outer housing while allowing axial movement); a plurality of brake teeth disposed on and/or coupled to the body and configured/oriented to engage the pinion (e.g. with brake teeth meshing with pinion teeth) responsive to the electro-magnetic tooth brake being engaged and/or the translating sleeve being in the second position; an electro-magnet configured to draw the body and/or brake teeth towards the pinion (e.g. with brake teeth engaging/meshing with the pinion teeth or any intermediate gear teeth) when engaged/powered (e.g. responsive to being powered/engaged); and a brake biasing member (e.g. brake spring) configured to bias the body and/or brake teeth away from the pinion (e.g. to retract the body and/or brake teeth, for example to disengage the brake teeth from the pinion teeth when the electro-magnet is not engaged/powered).

An eighth embodiment can include the safety valve of the seventh embodiment, wherein the electro-magnet is disposed on or in the body.

A ninth embodiment can include the safety valve of any one of the seventh to eighth embodiments, wherein the electro-magnet is configured to generate a magnetic force capable of engaging the brake teeth (e.g. with the pinion teeth, either directly or indirectly, for example engaging/meshing to lock/prevent rotation of the pinion (thereby locking the axial position of the translating sleeve).

A tenth embodiment can include the safety valve of any one of the seventh to ninth embodiments, wherein the electro-magnet comprises at least one coil, wherein the at least one coil is operable to generate the magnetic force to hold the translating sleeve axially in place (e.g. when powered).

An eleventh embodiment can include the safety valve of any one of the seventh to tenth embodiments, further comprising a rail mount configured to hold/secure/attach (e.g. radially fix) the body to the inner surface of the outer housing, while allowing sliding translation of the body axially within the bore (e.g. axially along a rail disposed (e.g. axially/longitudinally) on the inner surface of the outer housing).

A twelfth embodiment can include the safety valve of any one of the first to eleventh embodiments, wherein the valve (e.g. the flapper valve) is biased closed by a flapper spring.

A thirteenth embodiment can include the safety valve of any one of the first to twelfth embodiments, wherein the valve is disposed on a distal (e.g. downhole) end of the outer housing A fourteenth embodiment can include the safety valve of any one of the seventh to thirteenth embodiments, further comprising a gear box (e.g. one or more intermediate gear) disposed between the brake teeth and the pinion.

A fifteenth embodiment can include the safety valve of the fourteenth embodiment, wherein the gear box comprises gear teeth which mesh with the pinion teeth (e.g. at least when the electro-magnet is powered/engaged, although typically the teeth may mesh at all times).

A sixteenth embodiment can include the safety valve of any one of the fourteenth to fifteenth embodiments, wherein when the electromagnet is engaged/powered, the brake teeth mesh with the gear teeth of the gear box.

A seventeenth embodiment can include the safety valve of any one of the fourteenth to sixteenth embodiments, wherein the gear box is configured with gear reduction, for example allowing less electromagnetic force to effectively hold/lock the position of the translating sleeve (e.g. resisting the biasing force configured to move the translating sleeve to the first/uphole/distal position).

An eighteenth embodiment can include the safety valve of any one of the first to seventeenth embodiments, wherein, when engaged/powered, the electro-magnetic tooth brake system holds the valve open, but when power is lost, the electro-magnetic tooth brake system disengages and the biasing force (e.g. power spring) moves the translating sleeve to the first position, closing the valve.

A nineteenth embodiment can include the safety valve of any one of the first to eighteenth embodiments, wherein the translating sleeve may be operable to move by well pressure (e.g. from the first to the second position).

A twentieth embodiment can include the safety valve of any one of the first to nineteenth embodiments, further comprising a hydraulic piston operable to transmit a force (e.g. axially) to the translating sleeve (e.g. to move the translating sleeve from the first position to the second position) (e.g. the piston is configured to move a translating sleeve assembly towards the flapper valve, thereby moving the translating sleeve to the second position).

A twenty-first embodiment can include the safety valve of any one of the first to twentieth embodiments, wherein a hydraulic piston is configured to receive and direct hydraulic pressure to translate the translating sleeve from the first position to the second position (e.g. overcoming the biasing force and/or compressing the biasing mechanism/spring).

A twenty-second embodiment can include the safety valve of any one of the twentieth to twenty-first embodiments, wherein the hydraulic piston is configured to receive hydraulic pressure from the surface of the well.

A twenty-third embodiment can include the safety valve of any one of the twentieth to twenty-first embodiments, wherein the hydraulic piston is configured to receive hydraulic pressure from below the valve (e.g. pressurized fluid from below the valve, which is higher than the pressure above the valve, can be directed to the piston).

A twenty-fourth embodiment can include the safety valve of any one of the first to twenty-third embodiments, further comprising an electric piston (e.g. the piston may be operated by electric motor).

A twenty-fifth embodiment can include the safety valve of any one of the twentieth to twenty-fourth embodiments, wherein the piston is coupled to the rack teeth of the electro-magnet tooth brake system and/or wherein the piston and the rack teeth (e.g. the translating sleeve) are operable to move (e.g. axially) together (e.g. due to fluid pressure).

A twenty-sixth embodiment can include the safety valve of any one of the first to twenty-fifth embodiments, wherein the pinion and/or the gearbox may be disposed in clean (e.g. hydraulic) fluid (e.g. within a gearbox housing).

A twenty-seventh embodiment can include the safety valve of the twenty-sixth embodiment, wherein pressure in the gearbox housing may be equalized with external pressure or there may be positive pressure in the gearbox housing (e.g. greater than the external pressure).

A twenty-eighth embodiment can include the safety valve of any one of the first to twenty-seventh embodiments, further comprising a nose (e.g. inner) spring and a power (e.g. outer) spring.

A twenty-ninth embodiment can include the safety valve of the twenty-eighth embodiment, wherein the nose/inner spring is configured to provide axial force towards the valve (e.g. downhole), for example to bias a flow tube main body towards the valve (e.g. so that moving the translating sleeve from the first position to the second position compresses the nose/inner spring to bias the flow tube main body towards the valve).

A thirtieth embodiment can include the safety valve of the twenty-ninth embodiment, wherein the flow tube main body comprises a flow tube shoulder, wherein the nose/inner spring is disposed between the flow tube shoulder and a translating sleeve assembly, wherein the translating sleeve and the translating sleeve assembly are fixedly attached.

A thirty-first embodiment can include the safety valve of any one of the twenty-eighth to thirtieth embodiments, wherein the power/outer spring is configured to provide axial force away from the valve (e.g. uphole), for example to bias the translating sleeve away from the valve (e.g. so that moving the translating sleeve from the first position to the second position compresses the power/outer spring to bias the translating sleeve away from the valve).

A thirty-second embodiment can include the safety valve of any one of the twenty-eighth to thirty-first embodiments, wherein the power/outer spring is disposed between a translating sleeve shoulder and a lower valve assembly (e.g. which fixes the axial position of the flapper valve within the outer housing), wherein the power/outer spring is operable to provide a positive spring force against the translating sleeve shoulder (e.g. biasing the translating sleeve away from the valve).

A thirty-third embodiment can include the safety valve of any one of the first to thirty-second embodiments, further comprising a flow tube main body disposed within the translating sleeve (e.g. radially inward and/or along the longitudinal centerline), wherein the flow tube main body has a first position and a second position.

A thirty-fourth embodiment can include the safety valve of the thirty-third embodiment, wherein in the first position, the flow tube main body is disposed above, away from, and/or distal to the valve and the valve is in the closed position, and in the second position the flow tube main body extends through the valve (e.g. contacts the flapper valve and holds it open) and the valve is in the open position.

A thirty-fifth embodiment can include the safety valve of any one of the thirty-third to thirty-fourth embodiments, wherein the flow tube main body is configured to move to the second/open position (e.g. extending through the valve) when the nose/inner spring force is sufficient to overcome a pressure differential (e.g. on the valve) and the flapper biasing force.

A thirty-sixth embodiment can include the safety valve of the thirty-fifth embodiment, wherein the pressure differential across the valve can be reduced when the nose/inner spring is in the compressed state (e.g. by pumping pressure on the uphole side of the flapper valve which is close to the downhole pressure and/or by pressure equalization about the flapper valve) in order to open the valve.

In a thirty-seventh embodiment, a method for operating a safety valve comprising: moving a translating sleeve of the safety valve from a first position (e.g. distal to a flapper valve) to a second position (e.g. closer to/in proximity with the valve), wherein the translating sleeve is biased from the second position towards the first position (e.g. away from/distal to the valve); and powering an electro-magnet of an electro-magnetic tooth brake system to engage (directly or indirectly, for example with an intermediate gear box therebetween and meshing with both) brake teeth with pinion teeth of a pinion (wherein the pinion teeth mesh with a plurality of (e.g. rack) teeth coupled to the translating sleeve), thereby fixing the translating sleeve in the second position.

A thirty-eighth embodiment can include the method of the thirty-seventh embodiment, wherein a less powerful electro-magnet and/or less power is needed to fix the translating sleeve in the second position, due to gear reduction.

A thirty-ninth embodiment can include the method of any one of the thirty-seventh to thirty-eighth embodiments, wherein placing the translating sleeve into the second position comprises activating a piston configured to push the translating sleeve from the first position to the second position.

A fortieth embodiment can include the method of the thirty-ninth embodiment, wherein activating the piston comprises diverting pressurized fluid from below the valve to the piston.

A forty-first embodiment can include the method of the thirty-ninth embodiment, wherein activating the piston comprises actuating an electric motor.

A forty-second embodiment can include the method of any one of the thirty-seventh to forty-first embodiments, wherein moving the translating sleeve from the first position to the second position compresses a power/outer spring of the safety valve to bias the translating sleeve from the second position towards the first position.

A forty-third embodiment can include the method of any one of the thirty-seventh to forty-second embodiments, wherein powering the electro-magnet draws an electric tooth brake (e.g. brake teeth) of the electro-magnetic tooth brake system towards the pinion, thereby engaging brake teeth with the pinion teeth.

A forty-fourth embodiment can include the method of the forty-third embodiment, wherein the brake teeth are configured for axial movement along a rail mount which is fixed to the bore of an outer housing, and the electro-magnet drawing towards the pinion comprises the brake teeth sliding axial along the rail mount.

A forty-fifth embodiment can include the method of any one of the thirty-seventh to forty-fourth embodiments, wherein moving the translating sleeve from the first position to the second position further comprises biasing a flow tube main body of the safety valve towards the flapper valve (e.g. compressing a nose/inner spring).

A forty-sixth embodiment can include the method of any one of the thirty-seventh to forty-fifth embodiments, further comprising, responsive to placing the translating sleeve in the second position (e.g. moving the translating sleeve from the first position to the second position) and/or desiring to open the valve, equalizing pressure on both sides of the valve, thereby opening the valve (e.g. due to the biasing of the flow tube main body, which then drives the flow tube main body through the valve to open the valve).

A forty-seventh embodiment can include the method of any one of the thirty-seventh to forty-sixth embodiments, wherein the valve is held in the open position so long as the translating sleeve is held (e.g. by the electro-magnetic tooth brake system) in the second position.

A forty-eighth embodiment can include the method of any one of the thirty-seventh to forty-seventh embodiments, further comprising de-powering the electro-magnet, releasing the brake teeth to move axially away from/disengage from the pinion (e.g. due to the biasing force).

A forty-ninth embodiment can include the method of the forty-eighth embodiment, further comprising, responsive to de-powering the electro-magnet, moving/sliding the translating sleeve to the first position (e.g. axially away from the valve) (e.g. due to the biasing force/power spring).

A fiftieth embodiment can include the method of the forty-ninth embodiment, wherein moving/sliding the translating sleeve from the second position to the first position closes the valve (e.g. slides the flow tube main body axially away from the flapper valve, thereby allowing the flapper valve, which is biased closed, to close).

A fifty-first embodiment can include the method of any one of the thirty-seventh to fiftieth embodiments, further comprising pumping treatment fluid uphole (e.g. to the surface) while the valve is in the open position.

A fifty-second embodiment can include the method of any one of the thirty-seventh to fifty-first embodiments, wherein the valve acts as a safety valve—for example, the valve is held open (by the electromagnetic tooth brake system) until there is a power failure, and the valve automatically closes upon power failure—for example during pumping of formation fluid uphole.

A fifty-third embodiment can include the method of any one of the thirty-seventh to fifty-second embodiments, wherein the safety valve comprises any one selected from the first to thirty-sixth embodiments.

In a fifth-fourth embodiment, a safety valve system comprises: the safety valve of any one of the first to thirty-sixth embodiments, wherein the safety valve is disposed downhole in a well (e.g. a hydrocarbon well).

A fifty-fifth embodiment can include the system of the fifty-fourth embodiment, further comprising an electrical connection (e.g. to the surface/platform) configured to power the safety valve (e.g. the electro-magnet); and a conduit (e.g. tubing).

A fifty-sixth embodiment can include the system of the fifty-fifth embodiment, wherein the safety valve is interconnected in the conduit (e.g. configured to be able to isolate a lower portion of the conduit from an upper portion of the conduit), and wherein the lower portion of the conduit is fluidly coupled to a formation (e.g. formation fluids in the well).

A fifty-seventh embodiment can include the system of any one of the fifty-fourth to fifty-sixth embodiments, further comprising a pump configured to pump formation fluids (e.g. via the conduit) from the well uphole (e.g. to the surface).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: $R=Rl+k*(Ru-Rl)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A safety valve for use downhole in a well comprises:
an outer housing having a longitudinal bore therethrough;
a valve having an open position and a closed position, wherein the valve is biased towards the closed position;
a translating sleeve disposed within the outer housing and configured to move axially between a first position distal to the valve and a second position proximal to the valve, wherein the translating sleeve is biased towards the first position when disposed in the second position; and
an electro-magnetic tooth brake system configured to maintain the translating sleeve in the second position when engaged, wherein the electro-magnetic tooth brake system comprises an electric tooth brake having an electromagnet configured to generate a magnetic force directed for moving brake teeth axially.

2. The safety valve of claim 1, wherein the electro-magnetic tooth brake system comprises:
a plurality of teeth coupled to the translating sleeve;
a pinion mounted within the outer housing and configured with pinion teeth intermeshing with the plurality of teeth when the translating sleeve is in the second position; and
the electric tooth brake.

3. The safety valve of claim 2, wherein the plurality of teeth may be directly coupled or indirectly coupled to the translating sleeve.

4. The safety valve of claim 1, wherein, when engaged, the electro-magnetic tooth brake system holds the valve open, but when power is lost, the electro-magnetic tooth brake system disengages and biasing force moves the translating sleeve to the first position, closing the valve.

5. A safety valve for use downhole in a well comprises:
an outer housing having a longitudinal bore therethrough;
a valve having an open position and a closed position, wherein the valve is biased towards the closed position;
a translating sleeve disposed within the outer housing and configured to move axially between a first position distal to the valve and a second position proximal to the valve, wherein the translating sleeve is biased towards the first position when disposed in the second position; and
an electro-magnetic tooth brake system configured to maintain the translating sleeve in the second position when engaged, wherein:
the electro-magnetic tooth brake system comprises:
a plurality of teeth coupled to the translating sleeve;
a pinion mounted within the outer housing and configured with pinion teeth intermeshing with the plurality of teeth when the translating sleeve is in the second position; and
an electric tooth brake; and
the electric tooth brake comprises:
a body operable to translate axially within the bore;
an electro-magnet configured to draw the body towards the pinion responsive to being engaged;
a plurality of brake teeth coupled to the body and configured to engage the pinion responsive to the electro-magnet being engaged and the translating sleeve being in the second position; and
a brake biasing member configured to bias the body away from the pinion.

6. The safety valve of claim 5, wherein the electro-magnet is configured to generate a magnetic force capable of engaging the brake teeth with the pinion.

7. The safety valve of claim 5, wherein the electro-magnet comprises at least one coil, wherein the at least one coil is operable to generate magnetic force sufficient to hold the translating sleeve axially in place via meshing of the brake teeth with the pinion.

8. The safety valve of claim 5, further comprising a gear box disposed between the brake teeth and the pinion; wherein the gear box comprises gear teeth which mesh with the pinion teeth; wherein when the electro-magnet is engaged, the brake teeth mesh with the gear teeth of the gear box; and wherein the gear box is configured with gear reduction.

9. A safety valve system for a well comprises:
the safety valve of claim 5, wherein the safety valve is disposed downhole in a well;
an electrical connection configured to power the safety valve; and
a conduit.

10. The system of claim 9, wherein the safety valve is interconnected in the conduit and configured to be able to isolate a lower portion of the conduit from an upper portion of the conduit.

11. The system of claim 10, further comprising a pump configured to pump formation fluids through the conduit.

12. The safety valve of claim 5, wherein, when engaged, the electro-magnetic tooth brake system holds the valve open, but when power is lost, the electro-magnetic tooth brake system disengages and biasing force moves the translating sleeve to the first position, closing the valve.

13. A method for operating a safety valve comprises:
moving a translating sleeve of the safety valve from a first position which is distal to a flapper valve to a second position which is proximal to the flapper valve, wherein the translating sleeve is biased from the second position towards the first position; and
powering an electro-magnet of an electro-magnetic tooth brake system to engage brake teeth of the electro-magnetic tooth brake system with pinion teeth of a pinion, thereby fixing the translating sleeve in the second position, wherein the pinion meshes with a plurality of teeth coupled to the translating sleeve; and
wherein moving the translating sleeve from the first position to the second position comprises activating a piston configured to push the translating sleeve from the first position to the second position.

14. The method of claim 13, wherein activating the piston comprises providing pressurized fluid from below the flapper valve or from the surface or from a downhole pump to the piston.

15. The method of claim 13, wherein moving the translating sleeve from the first position to the second position compresses a power spring of the safety valve to bias the translating sleeve from the second position towards the first position.

16. The method of claim 13, wherein powering the electro-magnet draws the brake teeth of the electro-magnetic tooth brake system axially towards the pinion, thereby engaging the brake teeth with the pinion teeth.

17. The method of claim 13, wherein moving the translating sleeve from the first position to the second position further comprises biasing a flow tube main body of the safety valve towards the flapper valve.

18. The method of claim 17, further comprising, responsive to moving the translating sleeve from the first position to the second position, equalizing pressure on both sides of the flapper valve, thereby opening the flapper valve.

19. The method of claim 18, further comprising de-powering the electro-magnet, releasing the brake teeth to disengage from the pinion.

20. The method of claim 19, further comprising, responsive to de-powering the electro-magnet, moving the translating sleeve to the first position, wherein moving the translating sleeve to the first position closes the flapper valve.

21. A safety valve for use downhole in a well comprises:
an outer housing having a longitudinal bore therethrough;
a valve having an open position and a closed position, wherein the valve is biased towards the closed position;
a translating sleeve disposed within the outer housing and configured to move axially between a first position distal to the valve and a second position proximal to the valve, wherein the translating sleeve is biased towards the first position when disposed in the second position;
an electro-magnetic tooth brake system configured to maintain the translating sleeve in the second position when engaged; and
a hydraulic piston operable to move the translating sleeve from the first position to the second position.

22. The safety valve of claim 21, wherein the hydraulic piston is configured to be activated by pressurized fluid diverted from below the valve or from the surface or provided by a downhole pump.

\* \* \* \* \*